United States Patent [19]
Wickland et al.

[11] Patent Number: 5,814,118
[45] Date of Patent: Sep. 29, 1998

[54] HEPA FILTER FOR VENTING CHAMBERS

[75] Inventors: Terry J. Wickland, Golden; Craig Washburn, Littleton, both of Colo.

[73] Assignee: Nuclear Filter Technology, Inc., Golden, Colo.

[21] Appl. No.: 751,752

[22] Filed: Nov. 18, 1996

[51] Int. Cl.$^6$ .................................................. B01D 46/24
[52] U.S. Cl. .......................... 55/385.4; 55/486; 55/503; 55/525; 55/527
[58] Field of Search ................... 95/286, 287; 55/385.4, 55/385.1, 486, 487, 488, 489, 525, 523, 527, 503; 210/483, 484, 488, 489, 490, 496

[56] References Cited

U.S. PATENT DOCUMENTS

| | | | |
|---|---|---|---|
| 1,639,133 | 8/1927 | Greene | 55/525 |
| 2,366,428 | 1/1945 | Scott | 55/441 |
| 2,603,308 | 7/1952 | McCall | 183/44 |
| 2,650,673 | 9/1953 | Bering et al. | 220/371 |
| 3,002,870 | 10/1961 | Belgarde et al. | 55/503 |
| 3,022,860 | 2/1962 | Bittner | 55/503 |
| 3,048,958 | 8/1962 | Barnes | 137/587 |
| 3,165,473 | 1/1965 | Pall et al. | 210/510 |
| 3,241,681 | 3/1966 | Pall | 210/493.5 |
| 3,327,866 | 6/1967 | Pall et al. | 210/499 |
| 3,505,038 | 4/1970 | Luksch et al. | 55/486 |
| 3,690,606 | 9/1972 | Pall | 245/1 |
| 3,733,792 | 5/1973 | Taylor | 55/488 |
| 3,772,857 | 11/1973 | Jackson et al. | 55/503 |
| 3,780,872 | 12/1973 | Pall | 55/525 |
| 4,012,211 | 3/1977 | Goetz | 55/487 |
| 4,136,796 | 1/1979 | Dubois et al. | 220/303 |
| 4,152,482 | 5/1979 | Reynolds et al. | 428/284 |
| 4,263,140 | 4/1981 | Wujnovich et al. | 210/499 |
| 4,391,873 | 7/1983 | Brassell et al. | 428/297 |
| 4,442,003 | 4/1984 | Holt | 210/445 |
| 4,500,328 | 2/1985 | Brassell et al. | 55/97 |
| 4,512,499 | 4/1985 | Uuskallio | 220/303 |

(List continued on next page.)

FOREIGN PATENT DOCUMENTS 598913   3/1948   United Kingdom.
1555001  11/1979  United Kingdom.

OTHER PUBLICATIONS

The Pall Porous Metals Filter Guide, PSS–700F, no date.
Pall Porous Metal Filters for Solids Separation in Liquid and Gas Service, no date.
The Pall Gas Solid Separation System for the Chemical Process, Refining and Mineral Industries, Bulletin GSS–1, no date.
Pall PMM™ Metal Membrane Filters, Copyright 1986.
SEGMET SEGMAX, Pall's New SEGMET and SEGMAX Metal Filter Segments, SEG–1, Mar. 1988.
Pall PFM™ Metal Fiber Filters for the Polymer Industry, PMF–735, no date.
Porous metal filter collects radioactive strontium in hot cell operation, Petro Expo, F030, *1985 Chemical Processing*.
Range of Metal Media Produced by Pall, Copyright 1990.
The Pall S Series PS Filter Element Guide, PSS–733a, no date.

*Primary Examiner*—Duane S. Smith
*Attorney, Agent, or Firm*—Millen, White, Zelano & Branigan, P.C.

[57] ABSTRACT

A high quality HEPA filter is used in a vent for venting a chamber containing a radioactive material such as a plutonium slurry. The filter element includes a stainless steel wire mesh tube which supports a sintered stainless steel filter media thereon. The wire mesh tube has a stainless steel end plate completely closing one end thereof and a stainless steel end plate with an exhaust outlet opening at the other end. The outlet opening communicates with a hollow core defined by the stainless steel wire mesh tube. The sintered stainless steel filter media has its longitudinal edges joined by a tungsten inert gas weld and is also welded directly to the end plates by completely closed circular welds. An annular housing of stainless steel surrounds the filter element in spaced relation thereto and has an axial inlet. The gas to be filtered flows into the inlet, around the filter element and through the sintered stainless steel filter media before exiting through the exhaust outlet.

7 Claims, 3 Drawing Sheets

U.S. PATENT DOCUMENTS

| | | | |
|---|---|---|---|
| 4,562,039 | 12/1985 | Koehler | 419/2 |
| 4,613,369 | 9/1986 | Koehler | 75/246 |
| 4,664,684 | 5/1987 | Dunn et al. | 55/525 |
| 4,687,579 | 8/1987 | Bergman | 210/347 |
| 4,706,836 | 11/1987 | Greck | 220/256 |
| 4,731,178 | 3/1988 | Rosenberg | 55/503 |
| 4,756,852 | 7/1988 | Temus | 252/633 |
| 4,772,508 | 9/1988 | Brassell | 428/367 |
| 4,793,509 | 12/1988 | Coleman | 220/207 |
| 4,808,337 | 2/1989 | Ramm et al. | 252/628 |
| 4,822,692 | 4/1989 | Koehler | 428/547 |
| 4,828,930 | 5/1989 | Koehler | 428/547 |
| 4,842,909 | 6/1989 | Brassell | 428/34.1 |
| 4,957,518 | 9/1990 | Brassell | 55/316 |
| 4,957,522 | 9/1990 | Brassell | 55/316 |
| 5,054,402 | 10/1991 | Brassell | 105/377 |
| 5,149,360 | 9/1992 | Koehler et al. | 75/228 |
| 5,280,951 | 1/1994 | Rizzi et al. | 280/736 |
| 5,290,445 | 3/1994 | Buttery | 55/503 |
| 5,308,370 | 5/1994 | Kraft et al. | 55/525 |
| 5,353,949 | 10/1994 | Seibert et al. | 220/371 |

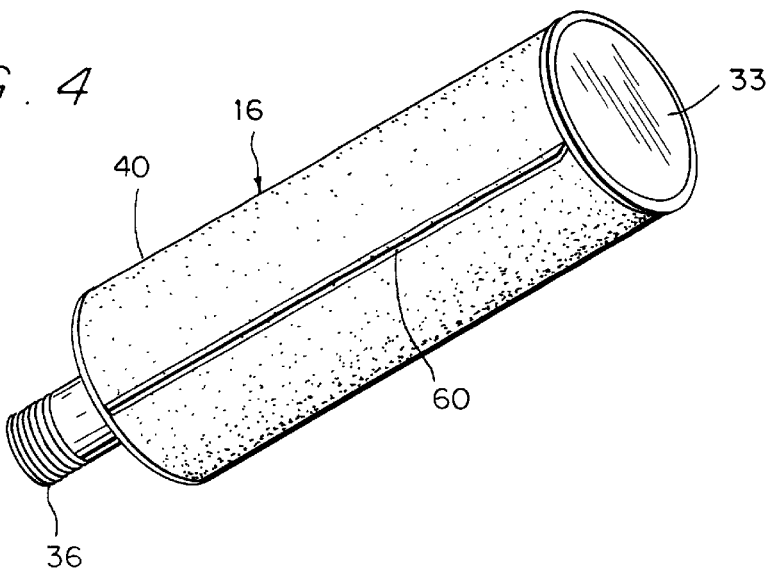
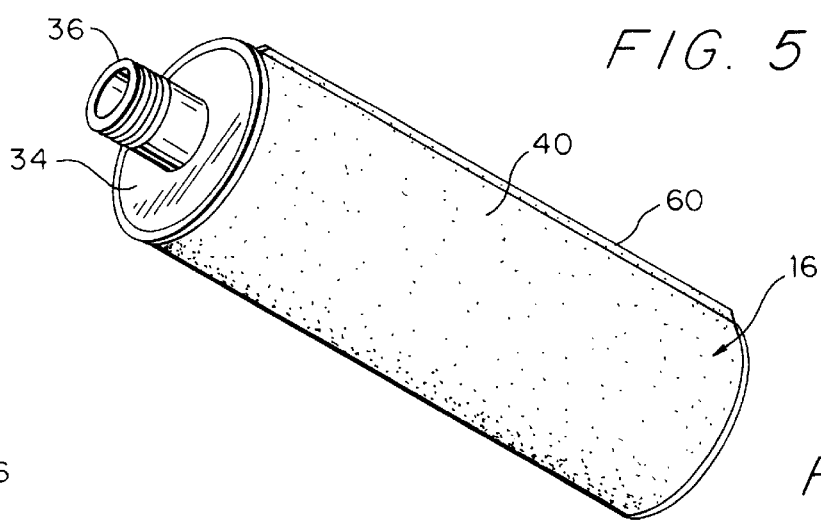
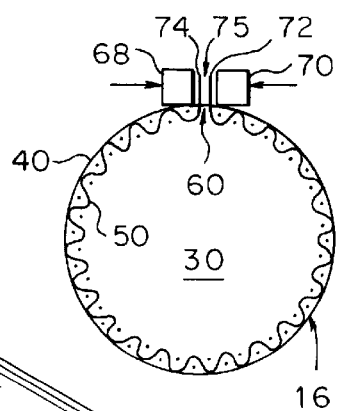
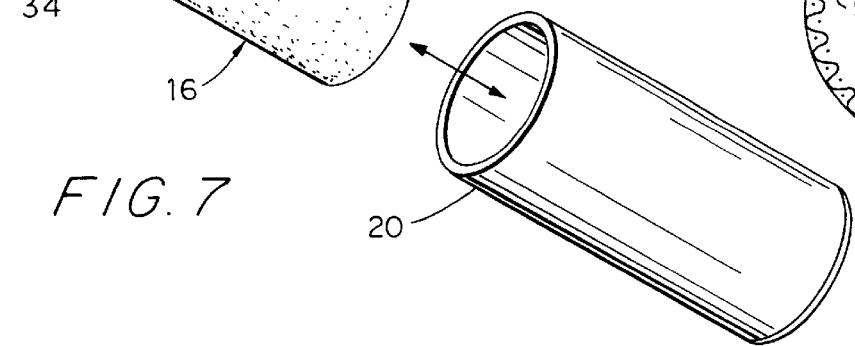

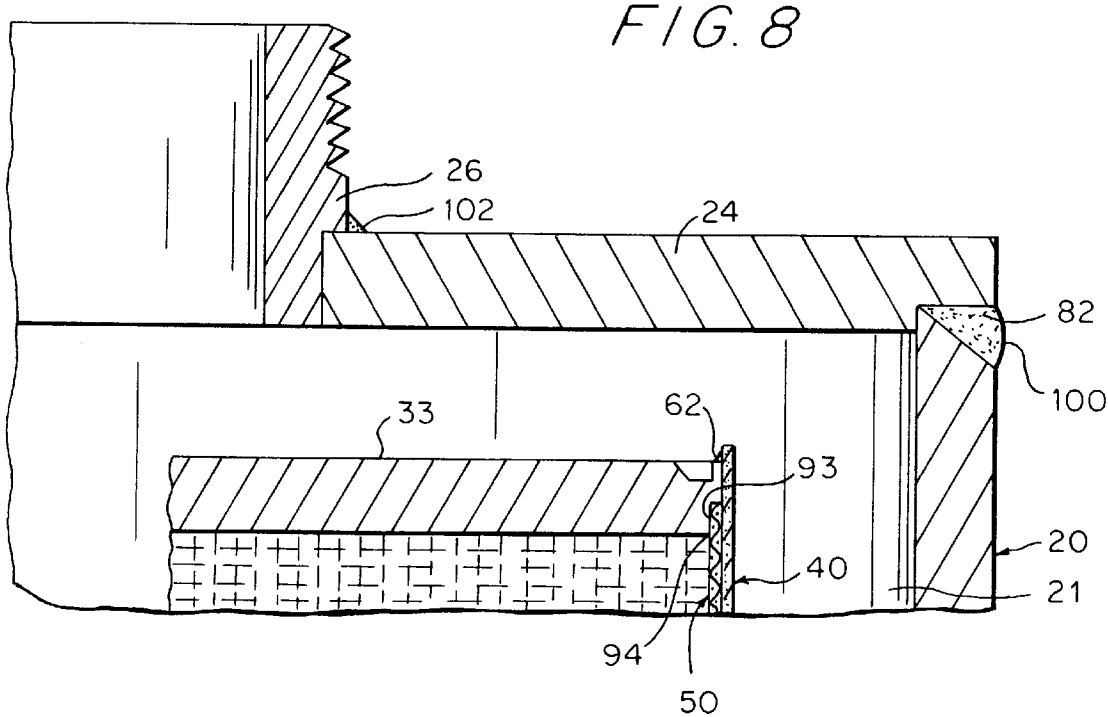
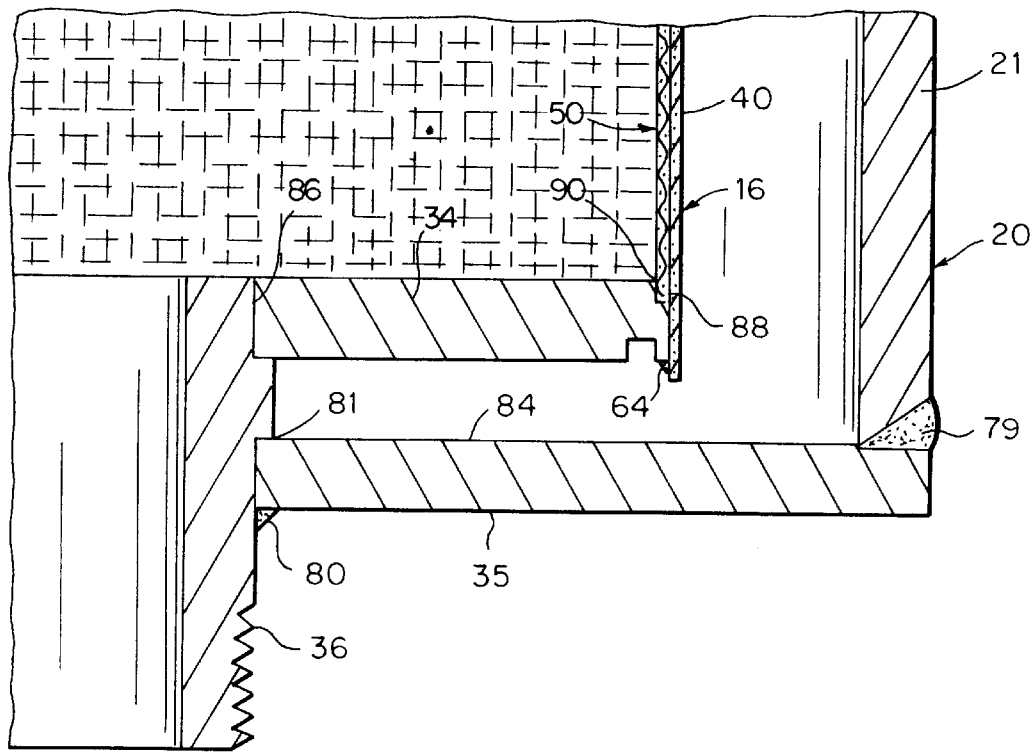

HEPA FILTER FOR VENTING CHAMBERS

FIELD OF THE INVENTION

The present invention relates to an HEPA filter and a method for making the filter. More particularly, the present invention is directed to an HEPA filter having a metal filter media for use in controlling flow of fluid with respect to a sealed area.

BACKGROUND OF THE INVENTION

In handling radioactive materials, such as radioactive waste materials, chambers or rooms are used to contain radioactive slurries. There is the possibility that the radioactive slurries will generate or release gases and vapors that will pressurize the chambers or rooms and may lead to explosions if the gases are combustible. Moreover, if the chambers must, for some reason, be opened, escaping pressurized gas can eject or have entrained therein radioactive material which could enter the surrounding environment. In order to prevent pressurization, these chambers are vented through vents having filter media of extremely high quality that have the capacity to trap very small solid particles having diameters in the range of about 0.3 to about 0.7 $\mu$m.

It is standard practice to make the filter media of the filters employed in such vents of sintered stainless steel fibers so as to have filters which are fire resistant, as well as resistant to pressures created by high air flow or shock waves. In addition, the filters must resist humidity and have the strength to support heavy particle deposits. When these phenomenon occur simultaneously, their combined interaction can drastically increase the likelihood of filter failure. Accordingly, stainless steel filters which resist these hazards are very expensive due to high material and fabrication costs. It is not unusual for these filters to cost at least several thousand dollars each.

Stainless steel filters are of use in other applications such as filters for clean rooms in which the filters filter inlet air as opposed to filtering exhaust gases, which is the case with storage facilities for nuclear materials. In addition, stainless steel filters are of use in any situation where all particulate matter must be removed from a gas stream.

SUMMARY OF THE INVENTION

In view of the aforementioned considerations, it is a feature of the present invention to provide a new and improved filter for removing all solid particles from a gas stream, wherein the fabrication expense of the filter is minimized, and wherein the possibility of leaks around past the filter media is, for all practical purposes, eliminated.

In view of these features and other features, the present invention comprises a filter element having a metal filter media wherein the metal filter media is mounted around a wire mesh support tube. The metal filter media is retained around the support tube by a welded, longitudinally extending seam which joins free edges of the filter media and by circular welds to end plates which close both ends of a resulting annular structure having a hollow core.

In a more specific aspect, the filter element is mounted within a tubular filter housing having an annular plenum surrounding the filter element as well as an inlet and outlet with the outlet being in communication with the hollow core of the filter element.

In still another specific aspect of the invention, the metal filter media is configured of sintered stainless steel strands, while the wire mesh support tube is woven and is also made of stainless steel.

In still another aspect of the invention, the filter is configured as a vent for venting a chamber containing hazardous materials, such as radioactive materials.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 4 is a perspective view showing a longitudinally extended, welded seam for joining the edges of the filter media to one another and a circular weld for welding the filter media to a first end plate in accordance with the present invention;

FIG. 5 is a perspective view of the filter element showing the longitudinal weld and a circular weld for welding the filter element to a second end plate having an outlet therein;

FIG. 6 is an end view showing how the longitudinal seam in the filter media is welded;

FIG. 7 is a perspective view showing the filter media being inserted into a housing; and FIG. 8 is an enlarged side elevation showing details of the filter assembly construction.

DETAILED DESCRIPTION

Figure 1:
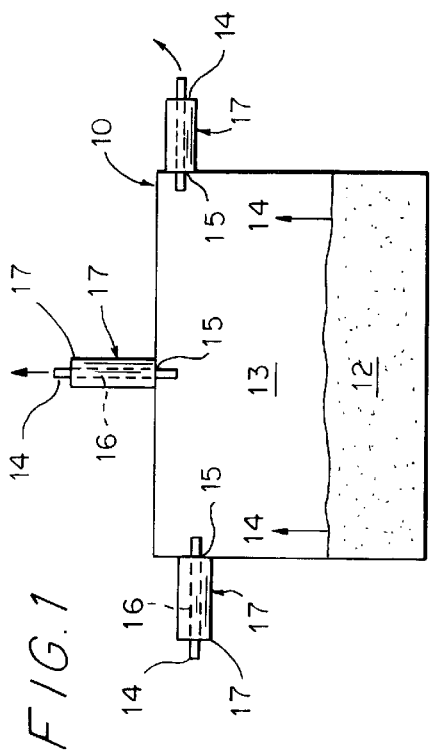
FIG. 1 is a side elevation illustrating a chamber containing hazardous materials and being vented by vents including filter elements configured in accordance with the principles of the present invention.

Referring now to FIG. 1, there is shown a chamber or room 10 containing a radioactive slurry 12 and having a head space 13 in which gases and vapors 14 from the slurry 12 accumulate. The head space 13 includes at least one vent 15 for venting the vapors 14 to the atmosphere. By venting the head space 13, pressure in the head space is kept at substantially atmospheric pressure so that pressure buildups do not occur, which buildups could lead to explosions or at least undesirable discharge of hazardous material into the environment. In order to ensure that no radioactive material escapes from the chamber 10, each vent 15 includes a stainless steel filter element 16 mounted in a filter assembly 17.

Figure 3:
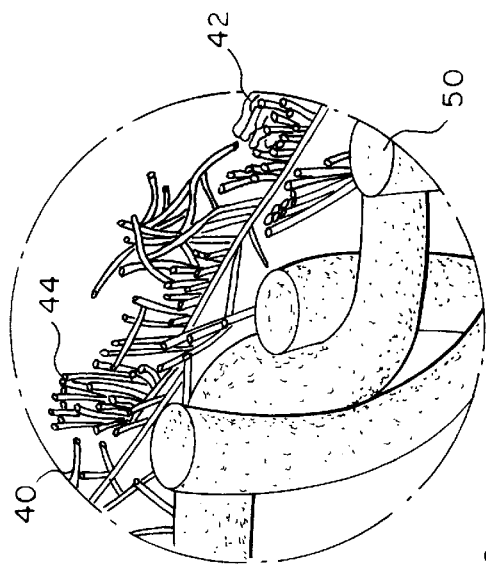
FIG. 3 is an enlarged view, in perspective, of a portion of the filter element configured in accordance with the present invention showing a filter media interfacing with a wire support screen.
Figure 2:
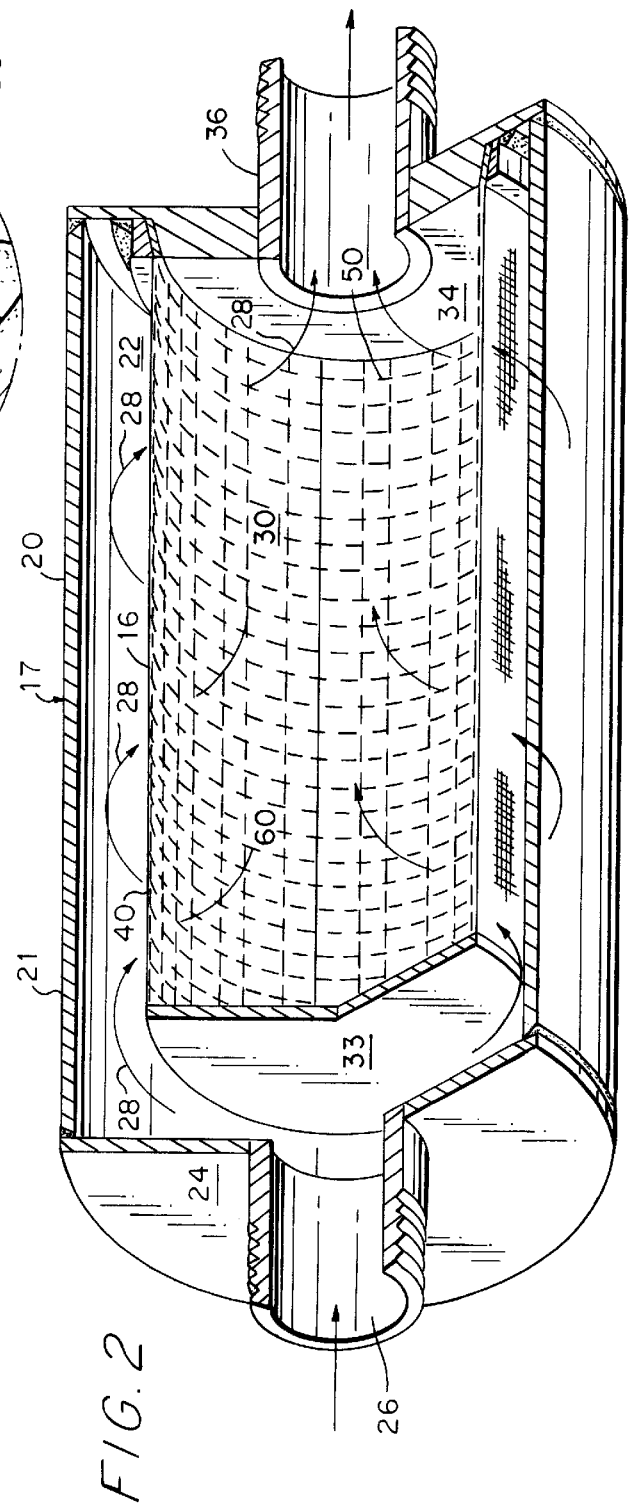
FIG. 2 is a perspective view, partially in elevation, of a filter assembly with which the principles of the present invention are employed.

Referring now to FIGS. 2 and 3, the filter assembly 17 comprising the vent 15 is shown with the filter media 16 within an annular housing 20 having a wall 21 defining an annular plenum 22 between the filter media and the annular housing. The annular housing 20 is closed by a cap 24 having an inlet 26 in communication with the plenum 22 so that gas and vapor from the head space 13 of FIG. 1 flows from the inlet into the annular plenum 22. The air in the annular plenum 22 then flows in the direction of arrows 28 into a hollow core 30 of the filter element 16. The hollow core 30 of the filter element 16 is closed by a first end plate 33 and a second end plate 34. The second end plate 34 has a threaded outlet nipple 36 which communicates with the hollow core 30 so that the gas being filtered can flow through to the outlet pipe 36.

As is seen in FIG. 3, the filter element 16 comprises a filter media 40 of sintered stainless steel fibers arranged as a fiber mat 44. The diameters of the fibers 42 are in a range of 2–40 μm and are generally equally distributed throughout the mat 44 so that the mat is of substantial uniform density. The mat 44 has a thickness in the range of about 0.010 inch to about 0.050 inch and is preferably about 0.014 inch thick. Such filter media will stop passage of virtually all solid particles since it will prevent passage therethrough of particles in the range of 0.3 μm to 0.7 μm.

Since the filter media 40 is relatively thin and flexible, it must be supported. This is accomplished by a wire mesh support tube 50 woven of stainless steel wire in a Dutch weave. The wire mesh tube has a thickness of about 0.06 inches which is sufficient to provide support for a filter element having a total outside diameter of about 2.714 inches.

Referring now to FIGS. 4 and 5 where the filter element 16 is shown before being mounted in the housing 20, it is seen that the mat 44 of the filter media 40 composed of the strands 42 (see FIG. 3) is welded along a longitudinal seam 60 to hold it snugly about the wire mesh support tube 50. The mat 42 of filter media 40 is also welded by a circumferential weld 62 to the first end plate 33 and by a circumferential weld 64 to the second end plate 34.

The weld along the seam 60 is a tungsten inert gas (TIG) weld, which is performed in accordance with the procedures shown in FIG. 6, wherein a pair of brass heat sinks 68 and 70 are positioned on opposite sides of longitudinally extending flange portions 72 and 74 of the mat 44 and the stainless steel filter material 40. The resulting weld 75 makes the seam 60 gas tight. Likewise, the welds 62 and 64 are circular tungsten inert gas, melt down-type welds which also ensure gas tight seams with the first end plate 33 and the second end plate 34.

As is seen in FIG. 7, assembly is accomplished by inserting the filter element 16, fabricated as is shown in FIGS. 4–6, into the annular housing 20. Filter element 16 is pushed into the housing 20 until the end plate 34 axially abuts the housing 20. The housing 20 is fabricated by welding the annular wall 21 to the end cap 35 by a circular weld 79 (See FIG. 8).

Referring now to FIG. 8, wherein the specific details of the filter assembly 17 used as vents 15 in FIG. 1 are shown, it is seen that the entire filter assembly is welded together to form a rigid unit with all elements being made of stainless steel. After the filter element 16 is inserted into the annular housing 20, the threaded outlet nipple 36 is welded by a circular tungsten inert gas weld 80 to the end plate 35 of the housing. The threaded outlet nipple 36 has a shoulder 81 which engages the inner surface 84 of the end plate 35 so as to properly seat the outlet nipple 36 in place. The outlet nipple 36 was previously welded by a circular TIG weld 86 to the end plate 34 of the filter element 16. The wire mesh screen 50 seats within a circumferential groove 88 in the end plate 34 and is spot welded in four places to the end plate 34 by welds 90. At its upper end, the wire mesh screen 50 is received in a peripheral groove 93 in the first end plate 33 and is tack welded to the first end plate 33 in four places by tack welds 94. The wire mesh screen 54 and first and second end plates 33 and 34 provide a relatively rigid annular structure to support the mat 44 of the stainless steel filter media 40 which is in turn welded by the circular welds 62 and 64 to the end plates 33 and 34, respectively (see also FIGS. 4 and 5).

After the filter element 16 is placed in the housing 20, the end cap 24 is welded by a circular weld 100 to the tubular portion 21 of the housing 20. Finally, the inlet nipple 26 is welded by a weld 102 to the end cap 24 so that the entire structure is one welded unit.

Generally, the radially extending end plates 24, 34 and 35 are made of 316 stainless steel and are about one-eighth inch thick. The axially extending tube 21 is also made of 316 stainless steel, is about 3.5 inches in outside diameter and about 7.75 inches long. The tube 21 is relatively thin having a thickness of about 0.10 inch.

The aforedescribed configuration for the vent and filter element provides an arrangement for removing virtually all solid particles which may become entrained in gas within the headspace 13 of the chamber 10 of FIG. 1. The weld of the longitudinal seam 60 and the circular welds 62 and 68 are absolutely closed so that all particles entrained in the gas 14 filtered by the filter element 16 are retained by the filter media 40.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A vent assembly comprising:
   an annular housing having first and second ends, and having a wall defining a space for receiving gas flowing through the first end, the first end having a gas inlet therein;
   a filter element disposed in the space within the annular housing, the filter element having an annular wire mesh support tube having first and second ends and defining a hollow core, the filter element being radially from the wall of the annular housing to provide an annular plenum between the filter element and housing, and the filter element also being axially spaced from and free of the first end of the annular housing, wherein gas entering through the inlet in the housing flows into the annular plenum;
   a first end plate completely closing the first end of the wire mesh support tube and a second end plate over the second end of the wire mesh support tube, the second plate having an exhaust outlet therethrough communicating with the hollow core;
   a filter media of metallic fibers disposed around the wire mesh support tube, the filter media having longitudinal edges welded to one another and circular end edges welded to the end plates, whereby gas flowing into the vent assembly fills the plenum around the filter element and passes through the filter media and into the hollow core of the filter element before exhausting through the exhaust outlet communicating with the hollow core.

2. The vent assembly of claim 1, wherein all components of the filter assembly are made of stainless steel and wherein welds are tungsten inert gas welds.

3. The vent assembly of claim 2, wherein the filter media removes particles in the range of 0.3 to 0.7 μm from the air stream.

4. An arrangement for venting to the atmosphere a chamber containing hazardous material wherein the chamber includes a head space containing gas, the arrangement comprising:
   at least one vent communicating with the head space and the atmosphere, the vent comprising an annular housing having a first end communicating with the head space and a second end exhausting to the atmosphere;
   a stainless steel filter element fixed within the housing in spaced relation thereto, the stainless steel filter element including a tubular wire mesh support around which is wrapped a stainless steel filter media having longitudinal edges joined along a longitudinally extending welded seam;

a first end plate affixed to the tubular screen to completely close one end of the tubular screen, the first end plate being axially from and free of the housing, and a second end plate fixed to the screen and having an exhaust outlet opening in communication with the hollow core defined by the screen and stainless steel filter media wrapped around the screen, the stainless steel filter media being welded with closed circular welds to the first and second end plates to seal the stainless steel filter media with respect to the end plates.

5. The arrangement of claim 4, wherein the housing is made of stainless steel with all elements of the housing being welded to adjacent elements to provide a rigid structure.

6. The arrangement of claim 5, wherein the material within the chamber is radioactive material and wherein the stainless steel filter media removes particles from the gas having a diameter greater than about 0.3 $\mu$m.

7. The arrangement of claim 4, wherein the material is radioactive material and wherein the filter media removes solid particles entrained in the gas as the gas passes therethrough which particles have a diameter greater than 0.7 $\mu$m.

* * * * *